(12) United States Patent
Hendel et al.

(10) Patent No.: US 9,042,383 B2
(45) Date of Patent: May 26, 2015

(54) UNIVERSAL NETWORK INTERFACE CONTROLLER

(75) Inventors: Ariel Hendel, Cupertino, CA (US); Martin Lund, Los Altos Hills, CA (US); Nicholas Ilyadis, Merrimack, NH (US)

(73) Assignee: BROADCOM CORPORATION, Irvine, CA (US)

( * ) Notice: Subject to any disclaimer, the term of this patent is extended or adjusted under 35 U.S.C. 154(b) by 84 days.

(21) Appl. No.: 13/173,189

(22) Filed: Jun. 30, 2011

(65) Prior Publication Data

US 2013/0003725 A1 Jan. 3, 2013

(51) Int. Cl.
*H04L 12/66* (2006.01)
*H04L 12/931* (2013.01)

(52) U.S. Cl.
CPC ............ *H04L 49/358* (2013.01); *H04L 49/505* (2013.01)

(58) Field of Classification Search
CPC ..... H04L 49/70; H04L 47/2441; H04L 49/00; H04L 49/205; H04L 49/356; H04L 49/357; H04L 49/90
USPC ......... 370/392, 396, 401, 422, 412, 419, 473, 370/462–466; 709/236, 239, 240, 241, 244, 709/226, 223, 249
See application file for complete search history.

(56) References Cited

U.S. PATENT DOCUMENTS

| | | | | |
|---|---|---|---|---|
| 6,973,093 | B1 * | 12/2005 | Briddell et al. ............... | 370/421 |
| 6,999,453 | B1 * | 2/2006 | Chemla et al. ................ | 370/389 |
| 7,151,744 | B2 * | 12/2006 | Sarkinen et al. ............... | 370/230 |
| 7,277,449 | B2 * | 10/2007 | Garinger et al. .............. | 370/419 |
| 7,391,786 | B1 * | 6/2008 | Prasad et al. .................. | 370/412 |
| 7,394,823 | B2 * | 7/2008 | Sano .............................. | 370/419 |
| 7,447,795 | B2 * | 11/2008 | Naghshineh et al. ......... | 709/238 |
| 7,558,264 | B1 * | 7/2009 | Lolayekar et al. ............ | 370/392 |
| 7,602,720 | B2 * | 10/2009 | Bergamasco et al. ......... | 370/235 |
| 7,633,955 | B1 | 12/2009 | Saraiya et al. | |
| 7,685,281 | B1 | 3/2010 | Saraiya et al. | |
| 7,733,781 | B2 * | 6/2010 | Petersen ....................... | 370/235 |
| 7,742,489 | B2 * | 6/2010 | Chinn et al. .................. | 370/401 |
| 7,773,526 | B2 * | 8/2010 | Abe .............................. | 370/239 |
| 7,860,120 | B1 * | 12/2010 | Wang et al. ................... | 370/418 |

(Continued)

OTHER PUBLICATIONS

European Search Report in co-pending, related European application No. 12004782.4, mailed Nov. 23, 2012.

(Continued)

*Primary Examiner* — Dang Ton
*Assistant Examiner* — Sai Aung
(74) *Attorney, Agent, or Firm* — Oblon, McClelland, Maier & Neustadt, L.L.P.

(57) ABSTRACT

A universal network interface controller (UNIC) is provided for interfacing a host computer to a switch fabric, a packet network, or both. The UNIC includes ingress transmit logic designed to transmit switch fabric data in memory associated with the host computer to a switch fabric. The UNIC further includes egress receive logic designed to receive switch fabric data from the switch fabric to store the received switch fabric data in the host memory associated with the host computer. As an option, the ingress transmit logic may be further designed to transmit packet network data in memory associated with the host computer to a packet network, such as Ethernet, and the egress receive logic may be further designed to receive the packet network data from the packet network and to store the received switch fabric data and the received packet network data in the host memory associated with the host computer.

22 Claims, 8 Drawing Sheets

(56) References Cited

U.S. PATENT DOCUMENTS

| | | | |
|---|---|---|---|
| 7,979,552 B1* | 7/2011 | Saraiya et al. | 709/226 |
| 8,139,482 B1* | 3/2012 | Eiriksson et al. | 370/230 |
| 8,213,427 B1* | 7/2012 | Eiriksson et al. | 370/391 |
| 8,265,071 B2* | 9/2012 | Sindhu et al. | 370/388 |
| 8,331,362 B2* | 12/2012 | Shukla et al. | 370/389 |
| 8,335,213 B2* | 12/2012 | Sindhu et al. | 370/388 |
| 8,340,088 B2* | 12/2012 | Sindhu et al. | 370/388 |
| 8,509,069 B1* | 8/2013 | Poon et al. | 370/230 |
| 8,601,053 B2* | 12/2013 | Mehrotra et al. | 709/203 |
| 2002/0141427 A1* | 10/2002 | McAlpine | 370/413 |
| 2002/0145974 A1* | 10/2002 | Saidi et al. | 370/230 |
| 2003/0200315 A1 | 10/2003 | Goldberg et al. | |
| 2006/0039374 A1* | 2/2006 | Belz et al. | 370/389 |
| 2008/0028096 A1* | 1/2008 | Henderson et al. | 709/236 |
| 2009/0080428 A1* | 3/2009 | Witkowski et al. | 370/392 |
| 2010/0061391 A1 | 3/2010 | Sindhu et al. | |
| 2011/0176425 A1* | 7/2011 | Li et al. | 370/237 |

OTHER PUBLICATIONS

Office Action issued Aug. 25, 2014 in Chinese Patent Application No. 201210228742.0, 8 pages.

\* cited by examiner

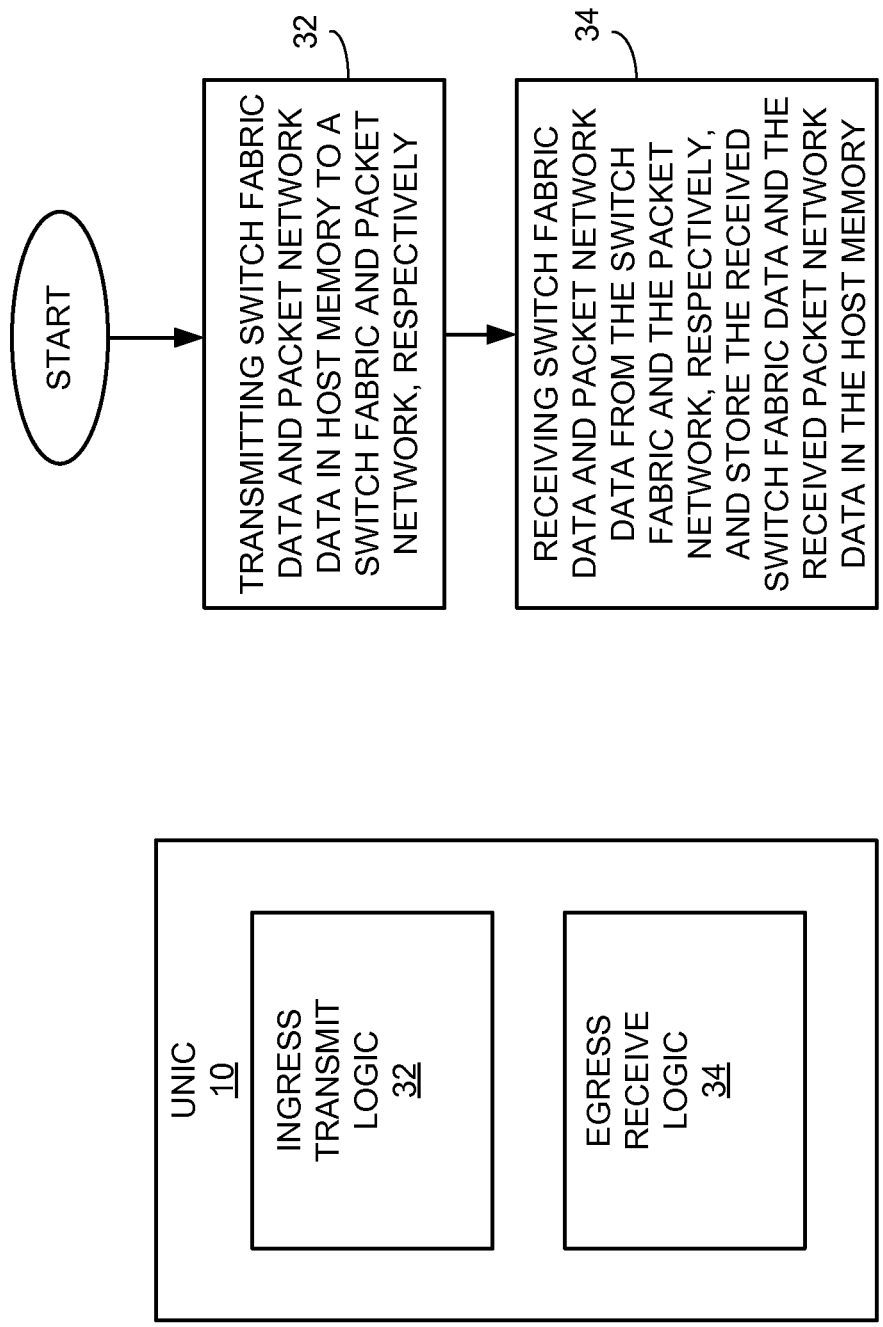

UNIVERSAL NETWORK INTERFACE CONTROLLER

BACKGROUND

Server computer networks suitable for enterprise or cloud computing need a scalable server infrastructure to host traditional or distributed applications. In the enterprise model, application instances execute in their respective physical (or virtual) servers and rely on the network to communicate with other applications or network services on other servers. Distributed applications, however, are decomposed and deployed across multiple physical (or virtual) servers. Furthermore, for a cloud infrastructure, multiple distributed applications typically coexist on the same server and network infrastructure.

Because of fast changing capacity and workload demands, a network fabric comprised of switches should be able to scale to larger node counts without impacting the cost per server. Also, a network fabric should exhibit, to the extent possible, symmetrical properties. Specifically, the network throughput achievable between two servers in the infrastructure should not differ materially on the basis of the relative physical location of the servers within a data center.

One of the trends resulting from the above requirements is the application of large multi-stage fabrics to interconnect physical server infrastructure. The topologies associated with these networks are fat trees, or combinations of fat trees with single or dual homed sub-trees at the bottom tier. The innovation associated with such multi-stage and multi-path networks has not extended into the server, neither in terms of path selection nor traffic capabilities. The state of affairs is one where endpoints attach to a network using a single homed or dual homed Ethernet interface with optional capabilities for link aggregation (single media access control (MAC) address shared by multiple links). Server interface selection is based on associating default routes for traffic, and physical interfaces to source IP addresses. Fabric path selection is not explicitly supported by the server, and routing algorithms are generally not extended to the server endpoint.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2A is a schematic block diagram of an example of the UNIC of FIG. 1A, according to various embodiments of the present disclosure.

FIG. 2B is a flow chart showing the operation and methodology employed by the UNIC of FIGS. 1A and 2A.

DETAILED DESCRIPTION

Figure 1A:
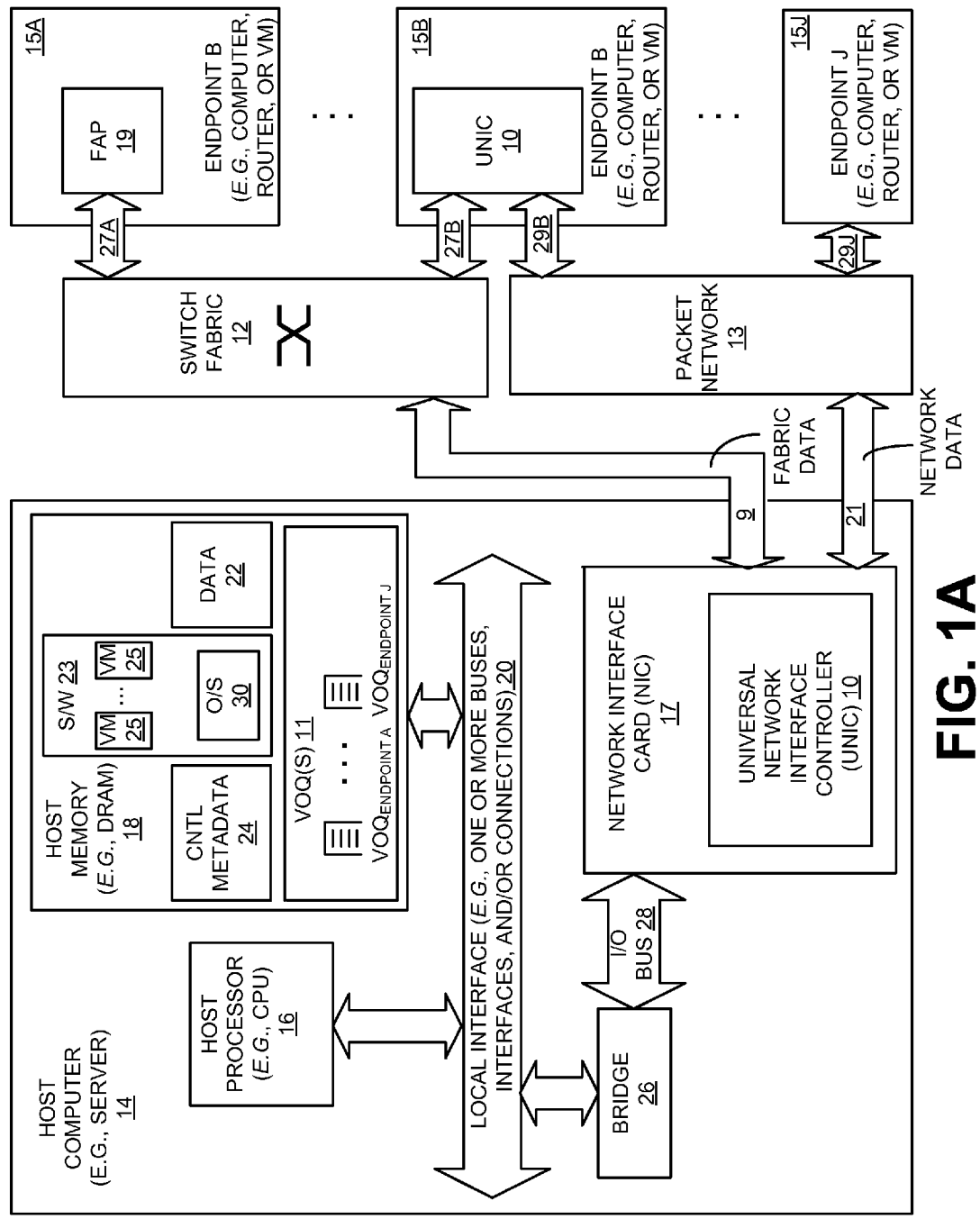
FIG. 1A is a schematic block diagram of a host computer (e.g., server) employing a universal network interface controller (UNIC), according to various embodiments of the present disclosure, to enable the host computer to exchange data through a switch fabric as well as a packet network.
Figure 1B:
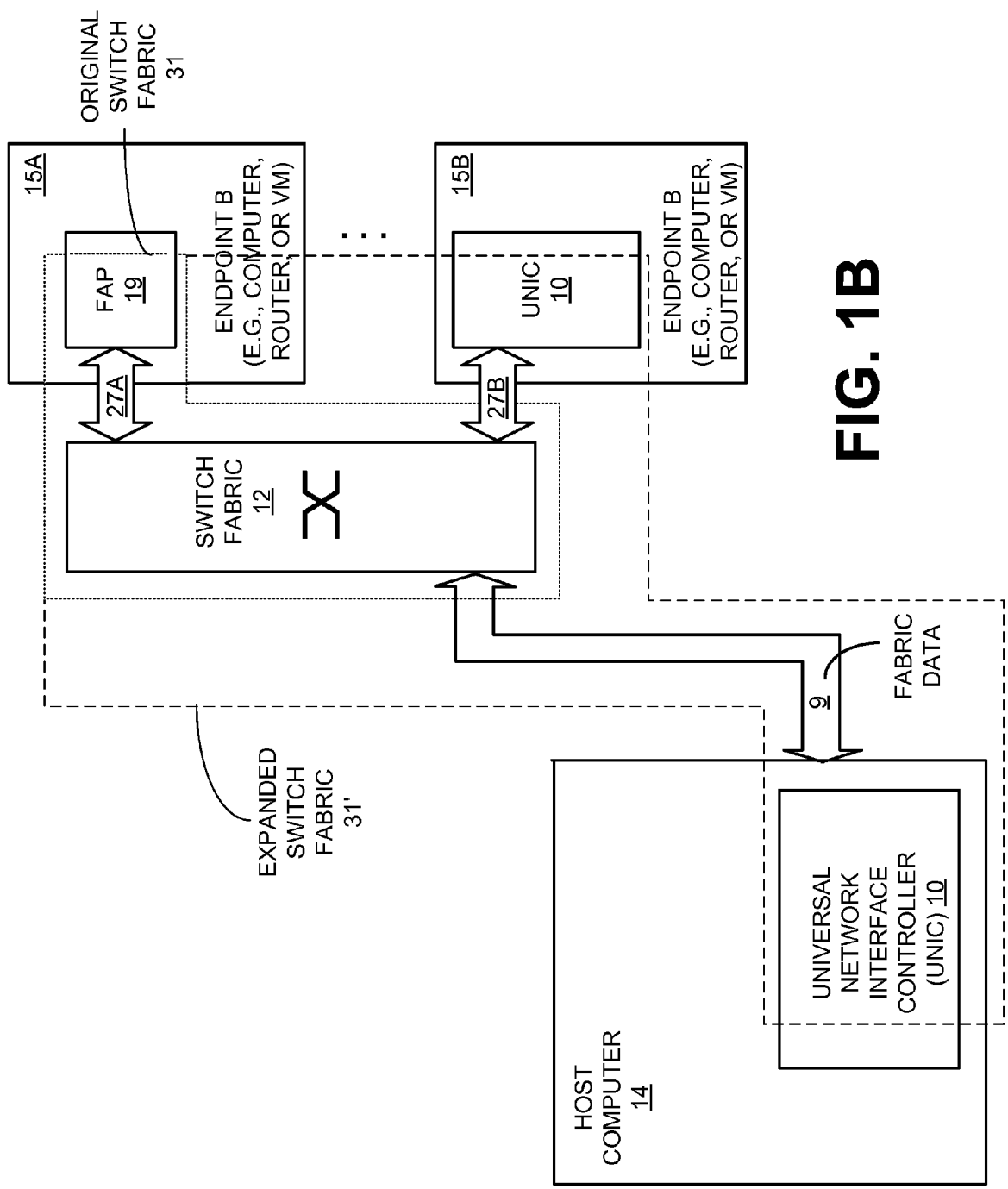
FIG. 1B is a schematic block diagram of an original switch fabric and the expanded switch fabric resulting from implementation of UNICs of FIG. 1A.

With reference to FIGS. 1A and 1B, the present disclosure provides various embodiments of a universal network interface controller (UNIC) 10, which is useful in connection with multi-tier computer networks. The UNIC 10 essentially (a) extends a network fabric 12 into a source or host endpoint, or host computer 14, so that fabric data 9 can be communicated through a switch fabric 12 and, as a further option, (b) provides packet interfaces so that network data 21 can be communicated to and from a packet network 13. The UNIC 10 is a new class of network interface, capable of directly interfacing with a switch fabric 12, and implementing the path selection, congestion control, routing, and failover functions associated with the fabric access point (FAP) 19 of traditional fabric endpoints 15A. The UNIC 10 can be implemented in software, hardware, firmware, or a combination thereof, but preferably, the UNIC 10 is implemented in a single microchip, and is situated on a board, for example, a network interface card (NIC) 17, associated with the host computer 14.

FIG. 1B illustrates expansion of an original switch fabric 31 to an expanded switch fabric 31'. The resulting expanded switch fabric 31' can be conceptualized as one that can arbitrarily combine a plurality of these UNICs 10 and traditional fabric endpoints 15A having FAPs 19 to produce an expanded switch fabric 12 that includes edge fabric ports as well as local server endpoint ports. The UNIC 10, when combined with fabric switches 12A-12H (FIG. 4) associated with the network fabric 12, minimizes the number of switching hops, eliminates one stage of switching in the path, provides virtual output queues (VOQs) 11 corresponding to the destination endpoints 15A-15J (to address head-of-line blocking) while eliminating deep buffers in FAPs 19 associated with the switch fabric 12 and network switches associated with the packet network 13, maximizes single flow throughput that is possible between source and destination endpoints, and provides precise scheduling and congestion management to the VOQs 11. In the following discussion, a detailed description of the UNIC 10 and its components is provided.

Figure 4:
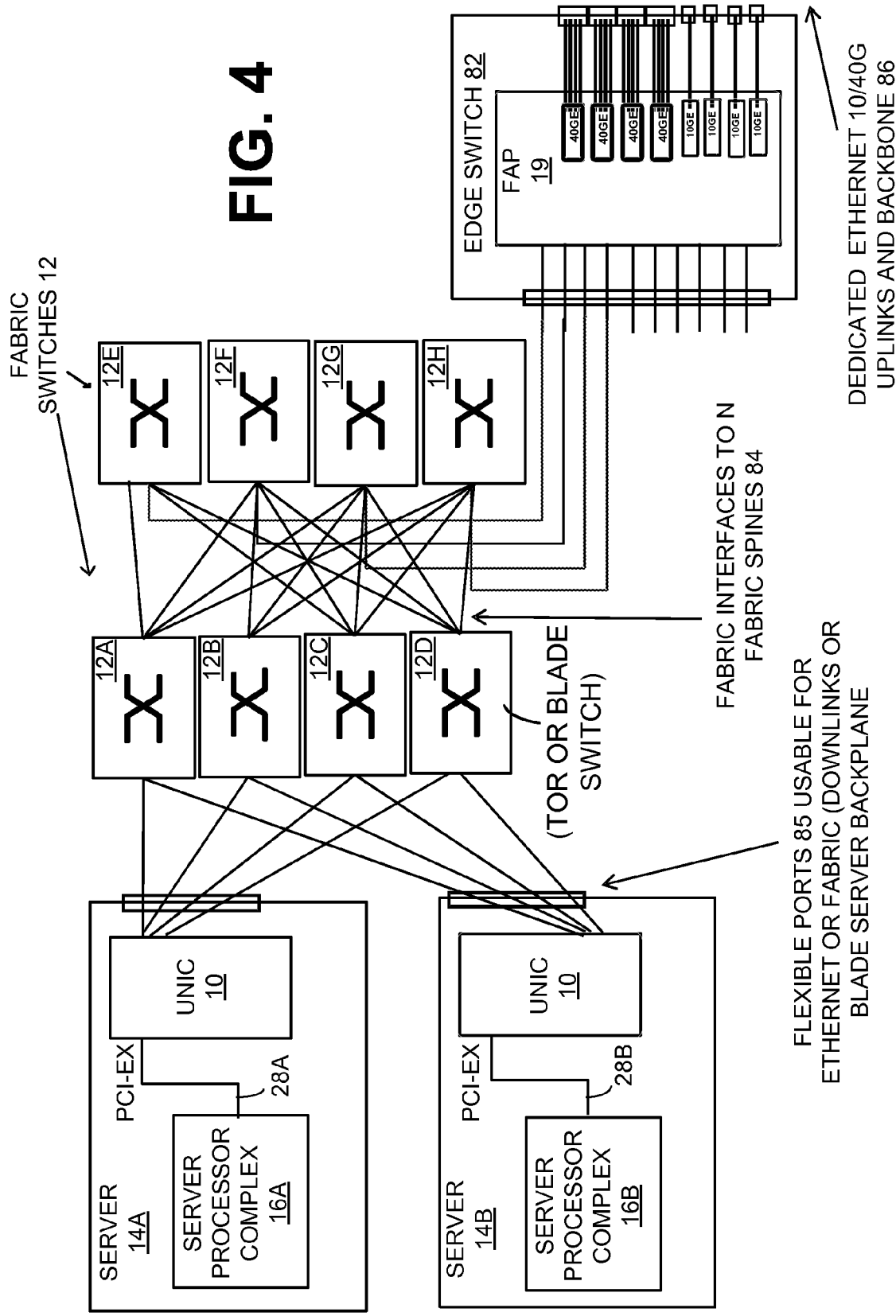
FIG. 4 is a schematic block diagram of the UNIC of FIG. 1A employed with an example of a multistage fabric switch and an Ethernet edge switch, according to various embodiments of the present disclosure.

Referring again to FIG. 1, shown is a schematic block diagram of an example of the host computer (e.g., server) 14 employing the UNIC 10 according to various embodiments. The host computer 14 communicates to one or more endpoints A, B, J, denoted by respective reference numerals 15A, 15B, 15J, through either (a) a network fabric 12 comprising one or more fabric switches 12A-12H (FIG. 4), but oftentimes, a multistage arrangement of switches (an example of which is shown in FIG. 4) or (b) a packet network 13. The endpoints 15A, 15B, 15J at the far end of the switch fabric 12 or packet network 13 are typically a computer, a router, or a virtual machine (VM). When fabric data 27A, in the form of packets or cells, is communicated to or from an endpoint 15A, the endpoint 15A utilizes a FAP 19, which comprises an interface between the fabric domain and packet domain. When fabric data 27B, in the form of packets or cells, is communicated to or from an endpoint 15B, the endpoint 15B utilizes a UNIC 10, which comprises an interface between the fabric domain and the packet domain. When network data 29B, in the form of packets, is communicated to or from the endpoint 15B, no FAP 19 is necessary, and the packets are communicated through the UNIC 10. When network data 29J, in the form of packets, is communicated to or from the endpoint 15J, no UNIC 10 or FAP 19 is necessary.

The host computer 14 includes at least one host processor 16 (e.g., a central processing unit (CPU), a plurality of processors, etc.) and a host memory 18, both of which are communicatively coupled via a local interface 20.

The host memory 18 can include volatile and nonvolatile memory, for example but not limited to, dynamic random access memory (DRAM), static random access memory (SRAM), read-only memory (ROM), hard disk drives, solid-state drives, etc. However, for this discussion, the host memory 18 is assumed to be DRAM.

The local interface 20 may comprise one or more buses, interfaces, and/or connections. For example, the local interface 20 may comprise a data bus with an accompanying address/control bus or other bus structure as can be appreciated.

Stored in the memory 18 are, among other things, the one or more VOQs 11, data 22, software (S/W) 23, and control (CNTL) metadata 24. The S/W 23 typically includes an operating system (O/S) 30, can optionally include virtual machines (VMs) 25, and can optionally include other applications, all of the foregoing of which are executed by the host processor 14. A VM 25 is a software implementation of a machine (i.e., a computer) that executes programs like a physical machine. The VOQs 11 can be operationally presented as kernel buffer queues, user space queues, or hybrid queues where the enqueue-dequeue operations are performed by a user space process, while the setup and maintenance of the VOQs 11 is mediated by the O/S kernel.

As further shown in FIG. 1, the UNIC 10 is preferably, although not necessarily, implemented on a network interface card (NIC) 17. The NIC 17 communicates data, control, and addressing information to and from an I/O bus 28, for example but not limited to, a PCI-Ex bus, which is interfaced with a bridge 26. The bridge 26 can be, for example, a southbridge or an I/O controller hub (ICH), associated with a computer motherboard. The bridge 26 connects to the local interface 20, so that the UNIC 10 can access the memory 18 and other components of the host computer 14. Note that in some alternative embodiments the UNIC 10 can be directly interfaced with the local interface 20 on a computer motherboard (so that the bridge 26, I/O bus 28, and NIC 17 are not necessary to implement the UNIC 10).

The host side of the UNIC 10 is presented as one or multiple system ports that can be mapped to data producers and consumers, for example, the VMs 25. When the UNIC 10 is configured for traditional Ethernet packet interfaces, the UNIC 10 implements the transmit and receive functions of Ethernet packets. When the UNIC 10 is configured for a cell fabric interface, the UNIC 10 queues and schedules packets or cells to the edge of the fabric 12, where the edge of the fabric 12 is any arbitrary combination of UNICs 10 and FAPs 19.

An example of commercially available FAPs 19 that can be employed to implement various embodiments of the present disclosure is the family with designation BCM88×4× that can be purchased from Broadcom Corporation, U.S.A.

FIG. 2A is a schematic block diagram of an example architecture of the UNIC 10 of FIG. 1, and FIG. 2B is a flow chart showing the operation and methodology employed by the UNIC 10 of FIG. 2A. In this example, the UNIC 10 includes ingress transmit logic 32 and egress receive logic 34. The terms "ingress" and "egress" relate to communications in a traffic manager (TM) domain associated with the switch fabric 12, whereas the terms "transmit" and "receive" relate to communications in the packet network domain. In general, the ingress transmit logic 32 is designed to transmit switch fabric data 9 and packet network data 21 in the host memory 18 associated with the host computer 14 to the switch fabric 12 and the packet network 13, respectively. Furthermore, the egress logic 34 is designed to receive switch fabric data 12 and packet network data 21 from the switch fabric 12 and the packet network 13, respectively, and to store the received switch fabric data 12 and the received packet network data 13 in the host memory 18 associated with the host computer 14.

An instance of interconnected fabric switches 12A-12H (FIG. 4) and FAPs 19 reside in the TM domain. The TM domain topology options include, but are not limited to, a mesh or a fabric 12. A mesh has direct connections between all participating FAPs 19 and UNICs 10 with no involvement of fabric switches 12A-12H (FIG. 4). A fabric topology is based on all edge devices (FAPs 19 and UNICs 10) connecting through fabric switches 12A-12H (FIG. 4) in a fully connected bi-directional graph generally instantiated as a fat tree.

The UNIC ingress into the TM domain can be conceptualized as a server sending traffic through its UNIC 10 (usually referred to as the transmit direction of the NIC 17). The system port associated with the ingress into the TM domain is defined as a traffic source and can be a physical server, a VM 25 within a server, a bus, or a specific queue. Different source system port granularities can coexist on the same TM domain across the same or different UNICs 10.

The ingress transmit logic 32 is designed to receive a fabric data packet and a network packet from the memory associated with the host computer 14. Each of the data packets has a header. The ingress transmit logic 32 is designed to produce a switch fabric link and a packet network link based upon the respective headers. The switch fabric link defines part of a path through the switch fabric 12 to a fabric destination endpoint 15A, 15B. The packet network link defines part of a path through the packet network 13 to a network destination endpoint 15B, 15J.

The UNIC egress from the TM domain corresponds to the destination system port abstraction and can similarly be a physical server, a VM 25 within a server, a bus, or a specific receive queue. Again, egress corresponds to the receive direction of the NIC 17.

Figure 3:
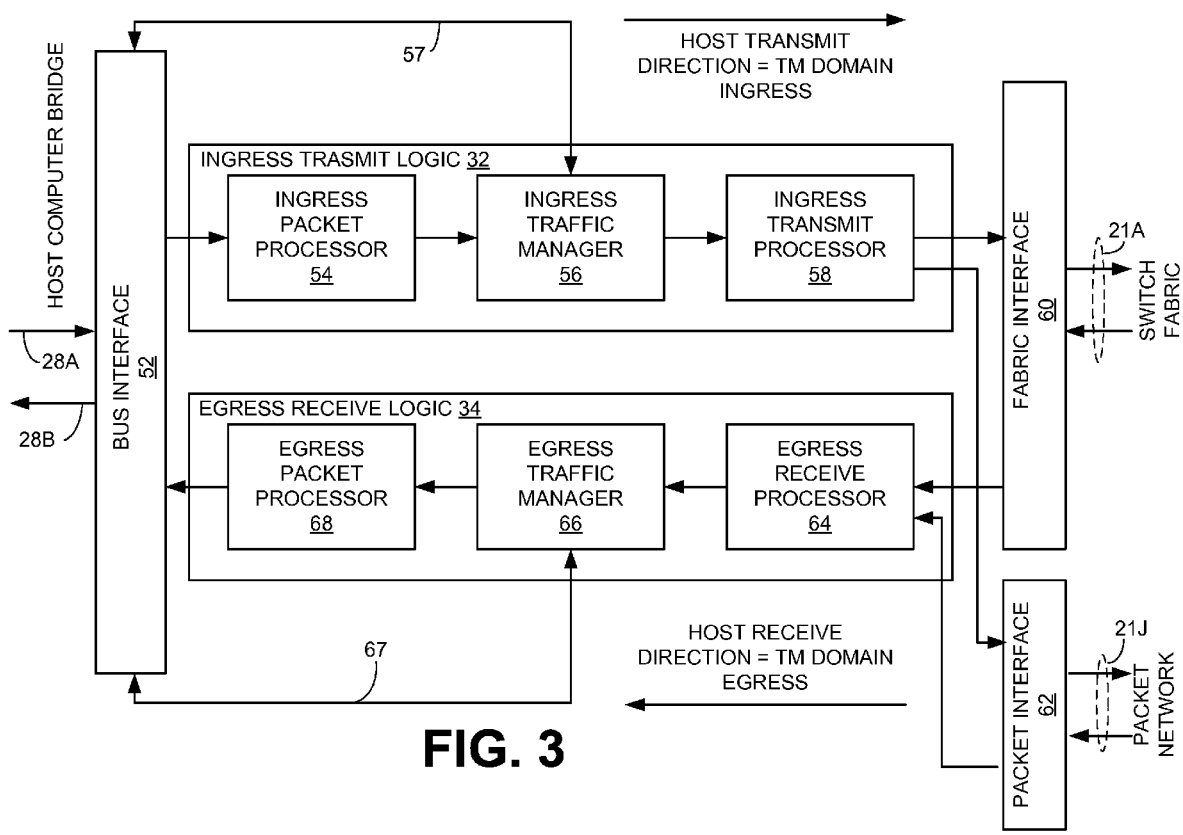
FIG. 3 is a functional block diagram of the example of the UNIC of FIG. 1A, according to various embodiments of the present disclosure.

With reference to FIG. 3, a functional block diagram of the architecture of the UNIC 10 is illustrated. The UNIC 10 can be implemented on one or more, but preferably a single integrated circuit microchip. As illustrated in FIG. 3, the UNIC 10 includes one or more bus interfaces 52, only one of which is shown for simplicity. The bus interface 52 is connected to the host computer 18 via I/O bus 28, thus enabling the UNIC 10 to communicate with the processor 16 and the memory 18 associated with the host computer 18.

When the software 23, for example, an application, in memory 18 wishes to initiate a communication with an endpoint 15, one or more packets originate in the software protocol stack of the host computer 14. Each packet is delivered to the bus interface 52 via, preferably but not limited to, a direct memory access (DMA) scheme for efficiency reasons. The bus interface 52 has local memory where the control metadata 24 concerning packets from the host memory 18 is temporarily stored. The control metadata 24 has information and instructions concerning the packets, for example, whether or not CRC should be inserted, pointers to data in the host memory 18, etc. Typically, the data payloads originate from the software 23 and the control metadata 24 originates from a device driver. Data is fetched via a DMA memory read by the bus interface 52 from the host memory 18.

In some alternative embodiments, a plurality of bus interfaces 52 to the host memory 18 should be implemented in order to enhance performance by increasing throughput capacity between endpoints 15 and the host computer 14. In such embodiments, the scheduling information, which is generated by the ingress traffic manager 56 and communicated to the host computer 14 via control data connection 57, is used to determine over which one of the plurality of bus interfaces 52 the data will be fetched from or deposited to a particular VOQ 11 in host memory 18.

The ingress transmit logic 32 generally includes an ingress packet processor 54, an ingress traffic manager 56, and an ingress transmit processor 58. The ingress packet processor 54 is designed to enqueue requests into an ingress traffic manager 56 based on packet headers and the control metadata 24. Ingress packet processor 54 may in itself use the bus interface 52 for accessing queuing data structures and for data storage in the host memory 18. Ingress packet processor 54 can modify fabric or packet headers.

The ingress packet processor 54 is designed to define the VOQs 11 and map the destination endpoints 15 to VOQs 11. In one simple example for purposes of illustration, each destination endpoint 15 can be identified by a MAC address (Open Systems Interconnection (OSI) layer 2). Moreover, in a simple example of mapping the MAC address to VOQs 11, each MAC address can be assigned to a corresponding one of the VOQs 11.

The ingress packet processor 54 can also be designed to determine whether the communication will be unicast or multicast. This functionality can be used to assist in connection with queuing. A unicast communication is from the host computer 14 to a specific destination endpoint 15, whereas a multicast communication is from the host computer 14 to a plurality of destination endpoints 15. In the case of a unicast communication, the ingress packet processor 54 assigns one VOQ 11 to the destination endpoint 15. This could be a physical port on a remote switch or a port on another UNIC 10.

The ingress traffic manager 56 is communicatively coupled to the ingress packet processor 54. The ingress traffic manager 56 implements a scalable number of the VOQs 11 in host memory 18 associated with destination endpoints 15A-J, which are managed by the ingress traffic manager 56 in a traffic manager (TM) domain. The VOQs 11 reside in the host memory 18 but are defined by and managed by the ingress traffic manager 56 in the UNIC 10. Preferably, the ingress traffic manager 56 slices the fabric packets into cells, each with a cell header, although this process is not necessary in some alternative embodiments and in some cases where diagnostics are performed. Furthermore, preferably, the ingress traffic manager 56 does not slice the network packets into cells, but rather ingress traffic manager 56 communicates the network packets with the packet header. The ingress traffic manager 56 queues and schedules the fabric cells and network packets based upon when a destination endpoint 15 is available and based upon the availability of links associated with a path through the switch fabric 12 and packet network 13, respectively.

The ingress traffic manager 56 manages the VOQs 11 in the memory 18 via control data connection 57. The ingress traffic manager 56 uses this control data connection 57 to dequeue data from a VOQ 11 using direct memory access (DMA).

The ingress traffic manager 56 manages at least one VOQ 11 for each destination endpoint 15. With respect to fabric data, the ingress traffic manager 56 schedules cells, rather than packets, from the VOQs 11. Generally, packets intended for the switch fabric 12 are broken down into smaller cells with a slicer associated with the ingress traffic manager 56. Moreover, packets intended for the packet network 13 are not broken down into cells and retain a packet header for the packet network 13. In the case of a fabric cell header, this is defined to enable communication of the fabric cells from endpoint to endpoint in the TM domain. In the case of a packet header, this is a typical Ethernet or IP header for communicating packets from endpoint to endpoint in the packet network domain.

The ingress traffic manager 56 also includes buffers that are used to temporarily store fabric data and network data as same is moved through the ingress traffic manager 56.

The ingress transmit processor 58 is communicatively coupled to the ingress traffic manager 56. The ingress transmit processor 58 is designed to manage the network packet representation(s) to be sent to one or more TM domain destination endpoints 15A, 15B or packet network destination endpoints 15B, 15J. The ingress transmit processor 58 is also designed to perform header modifications requested in packet data structures, for example, edits, replications, etc., to the cells as the cells are being dequeued. As a further specific example, in the case of a multicast communication, a single cell representation is queued by the ingress traffic manager 56 in a local queue, and when the ingress transmit processor 58 dequeues the cell, the ingress transmit processor 58 will modify the cell header so that it is communicated to the various applicable destination endpoints 15.

In the example of FIG. 3, the UNIC 10 is shown with separate physical connections to a fabric interface 60 and a packet interface 62. In other embodiments, these can be statically multiplexed to the same physical connections, operating in one mode or the other at any given point in time. The fabric and packet interfaces 60, 62 are designed to, in a mutually exclusive fashion, ingress and egress to and from either the TM domain switch fabric 12 or the traditional packet switched network 13. Fabric cells are communicated by the fabric interface 60 into the switch fabric 12, and network cells with packet headers are communicated by the packet interface 62 into the packet network 13.

The egress receive logic 34 includes an egress receive processor 64, an egress traffic manager 66, and an egress packet processor 68. The egress receive processor 64 uses fabric cell header information or packet header information to queue requests into an egress traffic manager 66 for one or more copies to be delivered into one or more host system ports. The egress receive processor 64 is capable of, among other things, applying policy filters that can result in the suppression of a particular packet delivery to a host system port.

The egress receive processor 64 receives fabric cells from the fabric interface 60 and network packets from the packet interface 62. The egress receive processor 64 analyzes (performs matching) header, for example, the OSI layer 2, OSI layer 3, and OSI layer 4 interfaces, for the purpose of determining whether or not to receive the packet. The egress receive processor 64 decides whether or not to associate with a particular queue. The egress receive processor 64 decides whether a modification should be made. The egress receive processor 64 may also perform replication, as there may be a plurality of VMs 25 associated with the host computer 14, and the bus interface 52 is not conceptualized as a single port. The egress receive processor 64 also reassembles cells from the fabric 12 into packets.

The reassembly can be performed with different mechanisms. In one embodiment, a reassembly buffer is implemented. An entire packet is assembled in a contiguous manner in the buffer, prior to moving the packet through the bus interface 52 into memory 18. In another embodiment, pointers associated with the cell header are manipulated so that the entire packet is stored contiguously in host computer memory 18.

The egress traffic manager 66 is communicatively coupled to the egress receive processor 64. The egress traffic manager 66 manages a number of queues (typically, a smaller number of queues as compared to the VOQs 11) in the host memory 18 via control connection 67. The egress traffic manager 66 can access the host memory 18 through the bus interface 52 for DMA of data and queue structures. The queuing model is different than on ingress because in the TM domain, the data is queued on ingress (on the transmit side). In contrast, on the egress side, the data is moved as fast as possible through the UNIC 10 to memory 18.

An egress packet processor 68 is designed to perform packet modifications. The egress packet processor 68 removes the cell headers in order to deliver packet representations exclusively (no fabric cell headers) through the bus interface 52 to a host system port and its corresponding consumer. The boundary between the TM domain and the bus interface 52 is at this egress packet processor 68. The egress packet processor 68 may also perform other modifications to the packets.

The egress packet processor 68 is also responsible for performing memory management functions in the host computer 14, such as managing DMA through the bus interface 52 into the host system ports, identification of which buffer should be consumed for copying packets (for example, a buffer in the kernel of the O/S of S/W 23, dedicated application buffer, etc.), etc.

FIG. 4 is a schematic block diagram of an example where a UNIC 10 in each of a plurality of servers 14A, 14B enables communication of fabric data 21A, preferably although not necessarily, fabric cells, through a multistage switch fabric 12 to and/or from an Ethernet edge switch 82, according to various embodiments of the present disclosure. In this example, each server 14A, 14B has a server processor complex 16A, 16B, each comprising a plurality of processors 16, communicatively coupled via a PCI-Ex I/O buses 28A, 28B to the multistage switch fabric 12. The server ports 85 associated with the servers 14A, 14B are flexible in that they can be allocated for use in connection with either an Ethernet network 13 (not shown in FIG. 3) or the switch fabric 12, depending upon the requirements of each.

The edge switch 82 has a FAP 19 for interfacing the edge switch 82 to the switch fabric 12 and dedicated Ethernet 10/40G ports 86 for uplinks and a backbone, for interfacing the edge switch 82 to an Ethernet network (not shown for simplicity). Note that the edge swtich 82 can be part of a server.

The multistage switch fabric 12 has fabric switches 12A-12H arranged in two successive stages interconnected via fabric spines 84. As nonlimiting examples, the switches 12A-12H can be crossbar switches, top-of-rack (TOR) switches, and/or blade switches. No fabric-to-packet translation is necessary in the switch fabric 12, as this takes place in the UNICs 10 associated with the servers 14A, 14B at a first endpoint and in the FAP 19 associated with the edge switch 82 at a second endpoint.

Figure 5:
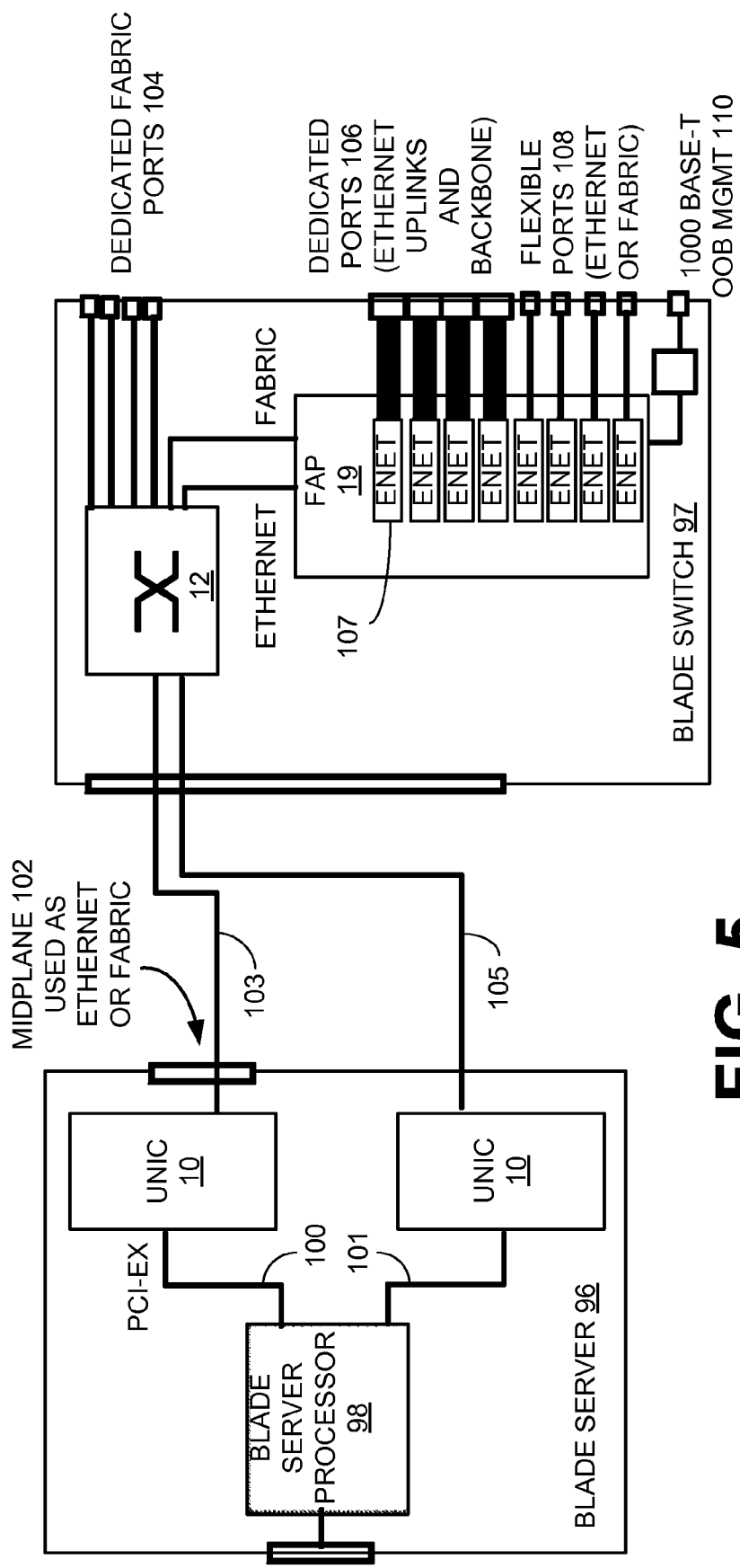
FIG. 5 is a schematic block diagram of a plurality of the UNICs of FIG. 1A situated in a blade server, according to various embodiments of the present disclosure, wherein a midplane can be used for the switch fabric and/or the packet network.

FIG. 5 is a schematic block diagram of an example of an implementation of the UNIC 10 in connection with a blade server 96 at a first endpoint that is communicatively coupled to a blade switch 97 at a second endpoint. On the blade server side, this example illustrates how bandwidth among blade servers can be increased. On the blade switch side, this example illustrates how bandwidth among blade switches 97 or data center PODs can be increased.

The blade server 96 includes a blade server processor 98 connected to a plurality of UNICs 10 via PCI-Ex buses 100, 101. A midplane 102 associated with the blade server 96 can be used for an Ethernet packet network 13 or switch fabric 12, depending upon requirements.

The blade switch 97 includes a switch fabric 12 communicatively coupled to the UNICs 10 of the blade server 96, as indicated by connections 103, 105. Internally, in the blade switch 96, the switch fabric 12 is connected to a FAP 19 for interfacing the blade switch 97 to the switch fabric 12. The switch fabric 12 provides dedicated fabric ports 104. The FAP 19 provides dedicated Ethernet ports 106 for uplinks and backbone, ports 108 that can be used for either Ethernet 13 or fabric 12, and a port 110 for 1000 Base-T OOB mgmt. (out of band management), all of the foregoing via Ethernet interfaces 107.

On the blade switch side, further note that multiple blade switches 97 can be meshed, or directly connected with FAPs 19 and/or UNICs 10 without any fabric switches involved. Moreover, multiple PODs can be connected together with additional external switches.

Figure 6:
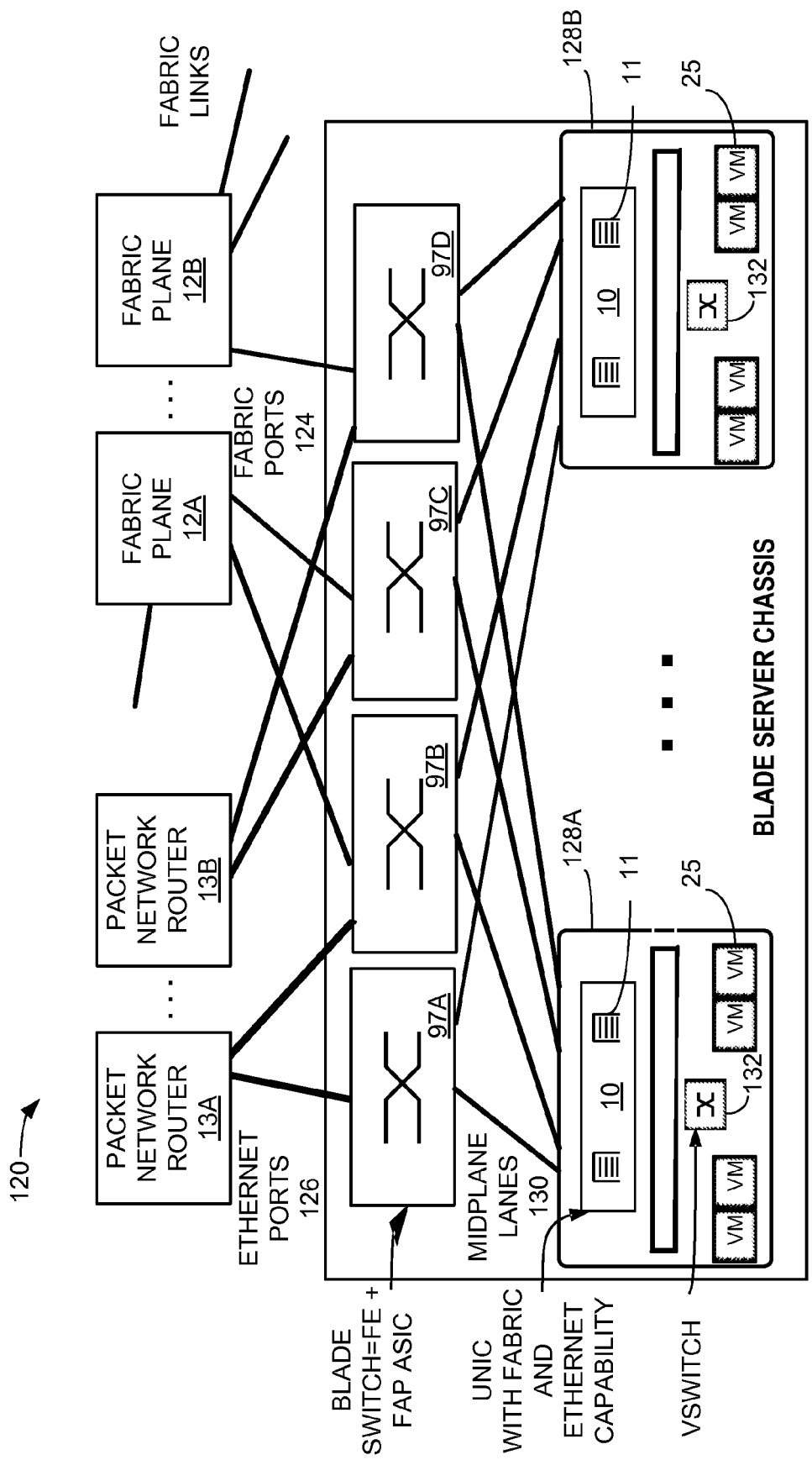
FIG. 6 is a schematic block diagram of the UNICs of FIG. 1A situated in a blade server network wherein fabric is extended to the blade server mezzanine, according to various embodiments of the present disclosure, to enable selective allocation of ports to fabric and routers in a data center.

FIG. 6 is a schematic block diagram of an example implementation of a plurality of UNICs 10 situated in a blade server network 120. In the blade server network 120, the switch fabric 12, shown as fabric planes 12A, 12B, as an example, is extended to the blade server chassis 122 to enable selective allocation of fabric ports 124 and Ethernet ports 126 to fabric 12 and routers 13A, respectively. The allocation depends upon the type of computer operation being performed. For example, in the case of an operation requiring many mathematical computations, then more ports would be allocated to the fabric 12. Furthermore, as a further example, in the case of an operation requiring extensive access to the Internet, then more ports would be allocated to the routers 13A.

In architecture, as illustrated in FIG. 6, a plurality of blades switches 97A-97D and a plurality of blade servers 128A, 128B are connected to the blade server chassis 122. Each of the blade switches 97A-97D has the architecture shown in FIG. 5 with a fabric element (FE) switch and a FAP 19 for the Ethernet ports 126. Preferably, although not necessarily, each of the blade switches 97A-97D is implemented as an application specific integrated circuit (ASIC). Moreover, a plurality of blade servers 128A, 128B are also connected to the blade server chassis 122 and communicate with the blade switches 97A-97D via midplane lanes 130.

Each blade server 128A-128B includes a plurality of VMs 25, each of which can be selectively communicatively coupled to the UNIC 10 via a virtual switch (VSWITCH) 132. The virtual switch is a software based switch that can be implemented in memory associated with the blade server 128A-128B.

The architecture of FIG. 6 can be extended outside of the blade chassis 122 with fabric devices for additional tiers or with a FAP 19 for routers ports. FIG. 6 shows a two stage fabric, including a first stage comprising blade fabric switches 91A-97D and a second stage comprising external fabric planes 12A, 12B. The Ethernet ports 126 of the blade switches 97A-97D can similarly be used to extend the network to additional external packet switches or packet router systems and ports.

Figure 7:
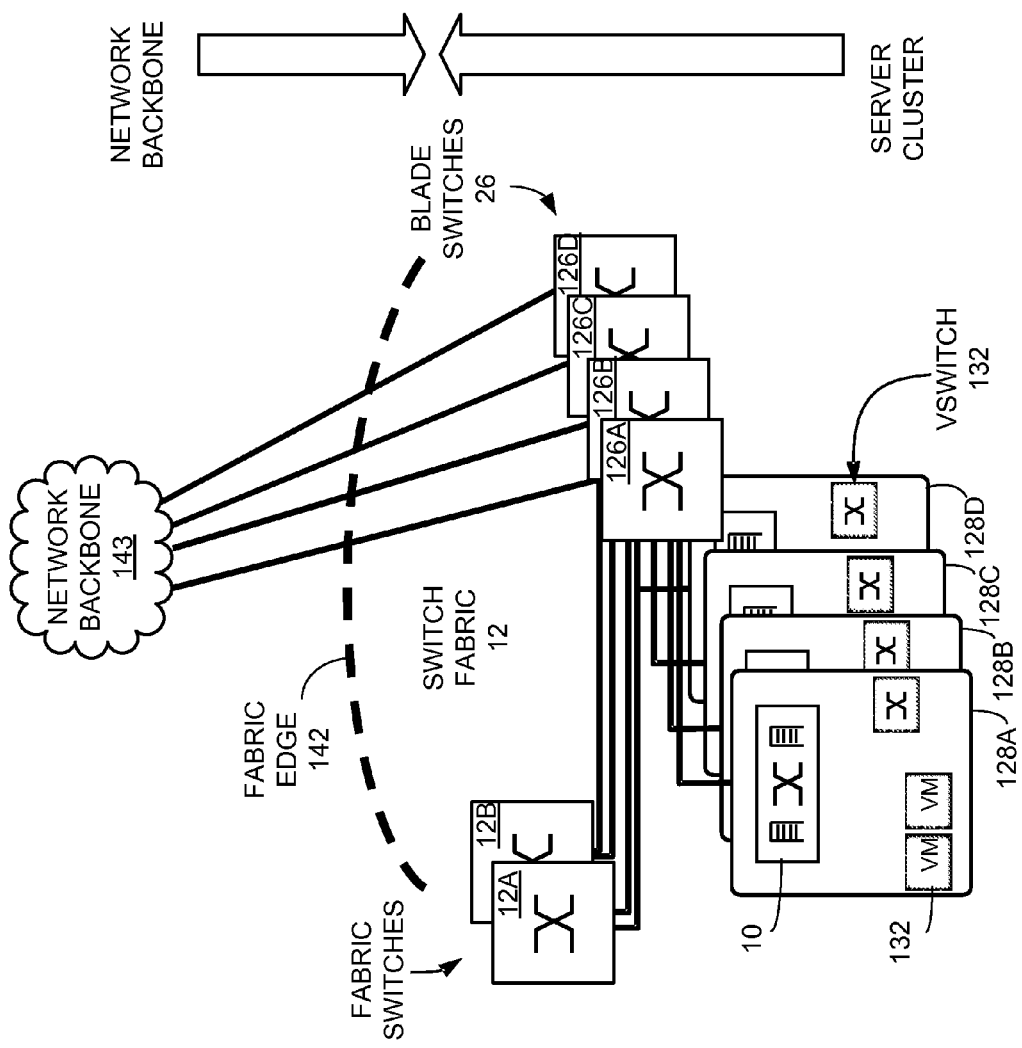
FIG. 7 is a schematic block diagram illustrating scaling of the blade servers of FIG. 6, according to various embodiments of the present disclosure, wherein the backbone network edge resides at the blade switches and remains there even as the switch fabric is scaled up to accommodate additional blade servers in the data center.

FIG. 7 is a schematic block diagram illustrating scaling of the blade servers of FIG. 6 in a data center. The fabric edge 142 between the network backbone 143 and blade switches 126A-126D in the blade server cluster resides at and will remain at the blade switches regardless of the number of blade servers 128A-128D that are implemented.

The fabric switches 12A, 12B can be, for example, scalable architecture of networking devices (SAND) switching devices. A commercially available SAND switch is the model DNFE600 that can be purchased from Broadcom Corporation, U.S.A. The fabric 12 created by the fabric switches 12A, 12B exhibits a single domain of manageability, unconstrained bandwidth, L2 adjacency (ideal for VMs 25), homogeneous proven L2 multipathing, and VOQ dynamic routing.

Note that the illustration of FIG. 7 does similarly apply to other servers, for example, rack servers, where switches 126A-126D would be TOR (top of rack) switches instead of blade switches. The benefit of scaling the number of servers deployed without altering the interconnection to the broader heterogeneous backbone 143 is still applicable. The dashed line fabric edge 142 represents both the physical demarcation as well as the management demarcation between the backbone 143 and the above mentioned server cluster.

It should be emphasized that the above-described embodiments of the present disclosure are merely possible examples of implementations set forth for conveying a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A network interface controller (NIC) for a host computer, comprising:
 a bus interface communicatively coupled to a memory within the host computer; and
 circuitry configured to:
 receive a fabric packet and a network packet from the memory via the bus interface to be transmitted to at least one external device;
 slice the fabric packet into at least one fabric cell; and
 queue and schedule the at least one fabric cell and the network packet for transmission of the at least one fabric cell and the network packet over a switch fabric and a packet network, respectively, to the at least one external device,
 wherein the circuitry comprises:
 an ingress packet processor configured to define at least one virtual output queue (VOQ) in the memory and map at least one destination endpoint to the at least one VOQ; and
 an ingress traffic manager configured to queue and de-queue the at least one fabric cell and the network packet in the at least one VOQ,
 wherein the circuitry is:
 configured to receive at least one egress fabric cell from the switch fabric and an egress network packet from the packet network and map the at least one egress fabric cell and the egress network packet to at least one egress queue, and
 configured to manage the at least one egress queue.

2. The NIC of claim 1, further comprising:
 a fabric interface configured to communicate the at least one fabric cell over the switch fabric; and
 a packet interface configured to communicate the network packet over the packet network.

3. The NIC of claim 1, wherein the circuitry is further configured to determine whether to queue and schedule one or more of the at least one fabric cell and the network packet for unicast or multicast communication over the switch fabric and the packet network, respectively.

4. The NIC of claim 1, wherein the circuitry is further configured to queue and schedule one or more of the at least one fabric cell and the network packet for communication over the switch fabric and the packet network, respectively, based on availability of the switch fabric and the packet network.

5. The NIC of claim 1, wherein the circuitry is further configured to produce a switch fabric link and a packet network link based upon respective headers of the fabric packet and the network packet, the switch fabric link defining a first path through the switch fabric to a fabric destination endpoint, and the packet network link defining a second path through the packet network to a network destination endpoint.

6. The NIC of claim 1, wherein the circuitry is configured to receive data from the switch fabric and the packet network, respectively, and store the data in the memory.

7. The NIC of claim 6, wherein the circuitry is communicatively coupled to an input/output (I/O) interface associated with the host computer by direct memory access.

8. A network interface controller (NIC) for a host computer, comprising:
 a bus interface communicatively coupled to a memory associated with the host computer; and
 circuitry configured to receive a fabric packet and a network packet from the memory via the bus interface, slice the fabric packet into at least one fabric cell, and queue and schedule the at least one fabric cell and the network packet for communication over at least one of a switch fabric and a packet network,
 wherein the circuitry comprises:
 an ingress packet processor communicatively coupled to the host computer via the bus interface and configured to define at least one virtual output queue (VOQ) in the memory and map at least one destination endpoint to the at least one VOQ;
 an ingress traffic manager communicatively coupled to the ingress packet processor and configured to queue and de-queue the at least one fabric cell and the network packet in the at least one VOQ; and
 an ingress transmit processor communicatively coupled to the ingress traffic manager and configured to communicate the at least one fabric cell and the network packet over the switch fabric and the packet network, respectively, to at least one external device,
 wherein the circuitry is:
 configured to receive at least one egress fabric cell from the switch fabric and an egress network packet from the packet network and map the at least one egress fabric cell and the egress network packet to at least one egress queue, and
 configured to manage the at least one egress queue.

9. The NIC of claim 1, wherein the circuitry is:
communicatively coupled to the switch fabric and the packet network, and
configured to modify the at least one egress fabric cell and deliver an egress fabric packet and the egress network packet to the memory.

10. A system, comprising:
a switch fabric;
a packet network;
a first universal network controller (UNIC) communicatively coupled to the switch fabric and the packet network; and
a second UNIC communicatively coupled to the switch fabric and the packet network, wherein the first UNIC comprises:
a bus interface communicatively coupled to a memory within a host computer; and
circuitry configured to:
receive a fabric packet and a network packet from the memory via the bus interface to be transmitted to the second UNIC;
slice the fabric packet into at least one fabric cell; and
queue and schedule the at least one fabric cell and the network packet for transmission of the at least one fabric cell and the network packet over the switch fabric and the packet network, respectively, to the second UNIC,
wherein the circuitry comprises:
an ingress packet processor configured to define at least one virtual output queue (VOQ) in the memory and map at least one destination endpoint to the at least one VOQ; and
an ingress traffic manager configured to queue and de-queue the at least one fabric cell and the network packet in the at least one VOQ,
wherein the circuitry is:
configured to receive at least one egress fabric cell from the switch fabric and an egress network packet from the packet network and map the at least one egress fabric cell and the egress network packet to at least one egress queue, and
configured to manage the at least one egress queue.

11. The system of claim 10, wherein the circuitry is further configured to determine whether to queue and schedule one or more of the at least one fabric cell and the network packet for unicast or multicast communication over at the switch fabric and the packet network, respectively.

12. The system of claim 10, wherein the circuitry is further configured to queue and schedule one or more of the at least one fabric cell and the network packet for communication over the switch fabric and the packet network, respectively, based on availability of the switch fabric and the packet network.

13. The system of claim 10, wherein the circuitry is further configured to produce a switch fabric link and a packet network link based upon respective headers of the fabric packet and the network packet, the switch fabric link defining a first path through the switch fabric to a fabric destination endpoint, and the packet network link defining a second path through the packet network to a network destination endpoint.

14. The system of claim 10, wherein the circuitry is configured to receive data from the switch fabric and the packet network, respectively, and store the data in the memory.

15. The system of claim 14, wherein the circuitry is communicatively coupled to an input/output (I/O) interface associated with the host computer by direct memory access.

16. A method of communication, comprising:
receiving a fabric packet and a network packet from a memory within a host computer via a bus interface to be transmitted to at least one external device;
slicing, with a network interface card (NIC), the fabric packet into at least one fabric cell;
queuing and scheduling, with the NIC, the at least one fabric cell and the network packet for transmission of the at least one fabric cell and the network packet over a switch fabric and a packet network, respectively, to the at least one external device;
defining at least one virtual output queue (VOQ) in the memory and mapping at least one destination endpoint to the at least one VOQ;
queuing and de-queuing the at least one fabric cell and the network packet in the at least one VOQ;
receiving at least one egress fabric cell from the switch fabric and an egress network packet from the packet network and mapping the at least one egress fabric cell and the egress network packet to at least one egress queue; and
managing the at least one egress queue.

17. The method of claim 16, further comprising determining whether to queue and schedule one or more of the at least one fabric cell and the network packet for unicast or multicast communication over the switch fabric and the packet network, respectively.

18. The method of claim 16, wherein the queuing and scheduling is based on availability of the switch fabric and the packet network.

19. The method of claim 16, further comprising producing a switch fabric link and a packet network link based upon respective headers of the fabric packet and the network packet, the switch fabric link defining a first path through the switch fabric to a fabric destination endpoint, and the packet network link defining a second path through the packet network to a network destination endpoint.

20. The method of claim 16, further comprising receiving data from the switch fabric and the packet network, respectively, and storing the data in the memory.

21. The NIC of claim 1, wherein the circuitry is further configured to receive the fabric packet and the network packet from the memory by direct memory access (DMA) via the bus interface.

22. The NIC of claim 1, wherein the circuitry is configured to:
define and manage the at least one VOQ virtual output queue (VOQ) in the memory;
map the at least one destination endpoint to the at least one VOQ; and
dequeue data from the at least one VOQ by direct memory access (DMA) via the bus interface.

* * * * *

UNITED STATES PATENT AND TRADEMARK OFFICE
CERTIFICATE OF CORRECTION

| | | |
|---|---|---|
| PATENT NO. | : 9,042,383 B2 | Page 1 of 1 |
| APPLICATION NO. | : 13/173189 | |
| DATED | : May 26, 2015 | |
| INVENTOR(S) | : Ariel Hendel et al. | |

It is certified that error appears in the above-identified patent and that said Letters Patent is hereby corrected as shown below:

In the Claims

In column 12, lines 54 and 55 change:

"define and manage the at least one VOQ virtual output queue (VOQ) in the memory;"

to -- define and manage the at least one VOQ in the memory; --

Signed and Sealed this
Twelfth Day of April, 2016

Michelle K. Lee
*Director of the United States Patent and Trademark Office*